United States Patent [19]

Rapp et al.

[11] 4,285,446

[45] Aug. 25, 1981

[54] AUTOMATIC PURGING SYSTEM HAVING A PRESSURE SENSOR AND A TIMING MECHANISM

[75] Inventors: John S. Rapp, Noblesville; David H. Jackson, Indianapolis, both of Ind.

[73] Assignee: Ransburg Corporation, Indianapolis, Ind.

[21] Appl. No.: 51,010

[22] Filed: Jun. 22, 1979

[51] Int. Cl.³ .......................... B05B 7/04; B67D 5/08
[52] U.S. Cl. ...................................... 222/70; 137/240; 222/148; 239/112
[58] Field of Search ................ 222/70, 135, 136, 148; 239/70, 112; 137/240, 624.11

[56] References Cited

U.S. PATENT DOCUMENTS

| | | | |
|---|---|---|---|
| 3,348,774 | 10/1967 | Wiggins | 239/112 X |
| 3,799,403 | 3/1974 | Probst et al. | 222/135 |
| 3,870,233 | 3/1975 | Wilhelm et al. | 239/112 X |
| 3,873,023 | 3/1975 | Moss et al. | 239/112 X |
| 4,062,472 | 12/1977 | Taube | 222/148 X |
| 4,169,545 | 10/1979 | Decker | 222/136 |

*Primary Examiner*—Robert J. Spar
*Assistant Examiner*—Fred A. Silverberg

*Attorney, Agent, or Firm*—Jenkins, Coffey, Hyland, Badger & Conard

[57] ABSTRACT

A plural component dispensing system includes supplies which furnish first and second components, such as a resin and catalyst, under pressure to a hand-held dispensing device having first and second valves, respectively. First and second passageways lead from the first and second valves to a mixing chamber in which the components are mixed, and from which the components are ejected. Upon mixing, the components are subject to increasing viscosity and hardening. A third valve controls flow of a purging medium from a supply of such a medium to the mixing chamber. A sensing device, such as a pressure sensor, senses the orientation of either/or both of the first and second valves. When the first and second valves are moved to positions to halt the flow of the two components, the sensing device generates a signal to start a first timing device. At the end of a predetermined time interval, the first timing device generates a signal which opens the third valve, permitting the purging medium to flow into the chamber and purge the mixed components from the chamber before they harden. The first timer also starts a second timer. At the end of a second predetermined time interval, the second timer generates a signal which closes the third valve, halting the flow of the purging medium.

8 Claims, 3 Drawing Figures

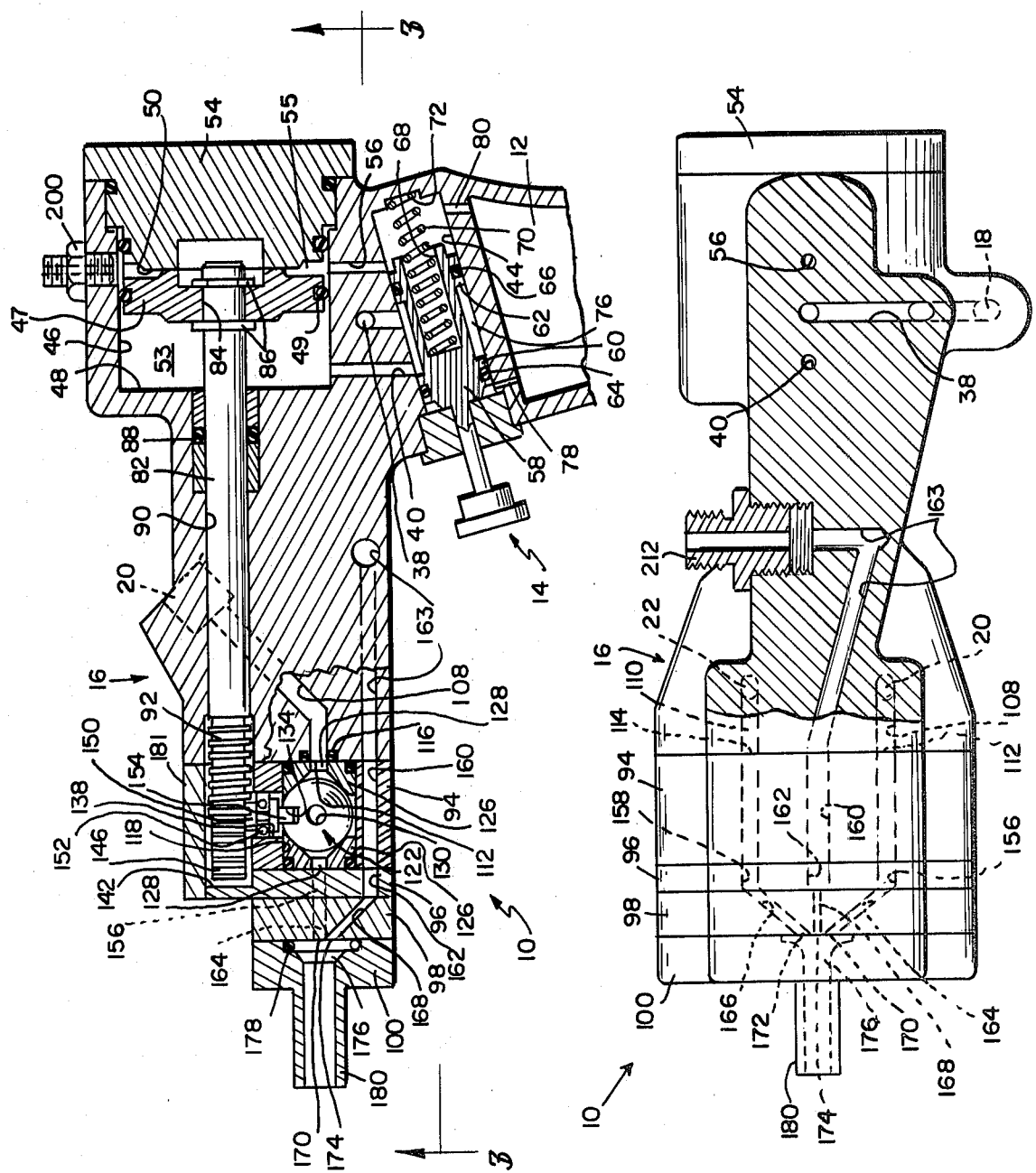

AUTOMATIC PURGING SYSTEM HAVING A PRESSURE SENSOR AND A TIMING MECHANISM

This invention relates to apparatus for dispensing hardenable materials. Particularly, this invention relates to a system for purging hardenable materials from dispensing apparatus.

In many industrial operations, materials are dispensed which are hardenable upon exposure to the atmosphere. In other situations, plural component materials are mixed in a dispensing apparatus and dispensed. In such situations, typically, once the components of such a plural component mix are combined, they begin to harden. Permitting such materials to harden in a dispensing apparatus necessitates often extensive, costly and time-consuming clean-up operations which interrupt the use of the apparatus.

Many types of systems have been proposed for automatically purging such hardenable materials from dispensing apparatus. Systems of various types are described in the following United States and foreign patents and applications:

| PATENT NO. | INVENTOR | DATE OF ISSUE |
|---|---|---|
| U.S. 3,799,403 | Probst et al | March 26, 1974 |
| U.S. 3,437,273 | Hagfors | April 8, 1969 |
| U.S. 3,708,123Z | Krueger | January 2, 1973 |
| U.S. 3,291,396 | Walter | December 13, 1966 |
| U.S. 3,741,441 | Eberle | June 26, 1973 |
| U.S. 3,790,030 | Ives | February 5, 1974 |
| U.S. 4,169,545 | Decker | October 2, 1979 |
| U.S. S.N. 21,672 | Decker | March 19, 1979 |
| British 240,728 | Elbert | October 8, 1925 |

Both of the above-identified U.S. patent applications are assigned to the same assignee as the present application.

Typically, the devices of the aforementioned patents and applications provide for movement of a trigger from a position in which the components of a plural component mix, or the hardenable single material, is dispensed, to a position in which a purging medium such as air, a non-reactive gas or a solvent, is flushed through the chamber in which mixing is done, or in which the material is subject to such conditions that hardening begins. Such medium flushes the hardenable material from the chamber before the material has an opportunity to harden.

In other systems of the types described in the aforementioned patents and applications, a separate trigger is provided for the purging medium. In such systems, use of certain purging mediums permits adjustment of the additional trigger to provide not only purging, but application of some of the medium to the hardenable material to aid in dispensing it, in curing it after dispensing and the like. A system of this type is the system described in the above-identified applications Ser. Nos. 820,839 and 21,672, in which air is used both to purge mixed components from the mixing chamber, and to add to the dispensed components as nucleating air. The amount of nucleating air mixed is adjustable independently of the amounts of the first and second components being mixed and dispensed. This provides substantial additional flexibility over other prior art systems.

In other systems of the types described in the above patents and applications, the hardenable material is mechanically purged by some component of the dispensing device. A device of this general type is described in U.S. Pat. No. 3,799,403.

As an example of one type of system which the apparatus of the present invention could be used, polyurethane foam systems of the thermosetting type are basically products of a chemical reaction of a polyol resin base and isocyanate hardener (frequently toluene diisocyanate or methane diisocyanate). Each component of the system is, by itself, generally stable. In other words, it will remain highly fluid for a considerable length of time, provided it is properly stored. Mixing of the resin and hardener components in the proper proportions, however, initiates a chemical reaction that causes the components to begin to polymerize and generate heat which volatilizes a blowing agent (generally included in one or both of the component materials). Volatilization of the blowing agent causes the resin to foam. The resin-containing component includes, in addition to the polyol base and the blowing agent (which is frequently Freon 11 or Freon 12), a catalyst which controls the setting time of the foam, and a surfactant, which controls the sizes of the foam cells.

It is an object of the present invention to provide a simple system including an automatic purging mechanism which is initiated only after the flow of the dispensed material has been interrupted and not resumed for a predetermined period of time.

Further according to the invention, the flow of the purging medium itself is timed, initiating only after the above-mentioned predetermined period of time, and continuing for only a second predetermined period of time.

According to the invention, apparatus for dispensing a material having the potential to damage the apparatus, such as by hardening, includes means providing a supply of the material, a housing to which the material supply-providing means is attached, the housing means includes a first valve means in communication with the supply-providing means, and a chamber from which the material is expelled from the apparatus. The first valve means is housed for movement between a first orientation in which the first valve means provides a flow of the material from the chamber, and a second orientation halting flow of the material from the chamber. Additional means provide a supply of a purging medium. Additional valve means controls the flow of the purging medium. Means are provided for establishing communication between the additional valve means and the chamber to provide a flow of the purging medium to the chamber. Means are provided for sensing when the first valve means is placed in the second orientation, and first timing means are coupled to the sensing means to time a first interval starting when the first valve means is placed in the second orientation and to open the additional valve means when the first interval reaches a predetermined duration to initiate the flow of the purging medium.

According to the illustrative embodiment of the invention, additional means are provided for sensing when the additional valve means is opened and for timing a second interval starting when the additional valve means is opened, and for closing the additional valve means when the second time interval reaches a predetermined duration.

Further according to the illustrative embodiment, the first valve means includes first and second valves for controlling flows of first and second components, respectively, which are mixed in the apparatus to form the material.

The invention may best be understood by referring to the following description and accompanying drawings which illustrate the invention. In the drawings:

FIG. 2 is a fragmentary sectional side elevational view of a plural component mixing apparatus constructed according to the present invention;

FIG. 3 is a sectional view of the apparatus of FIG. 2 taken generally along section lines 3—3 thereof.

Figure 1:
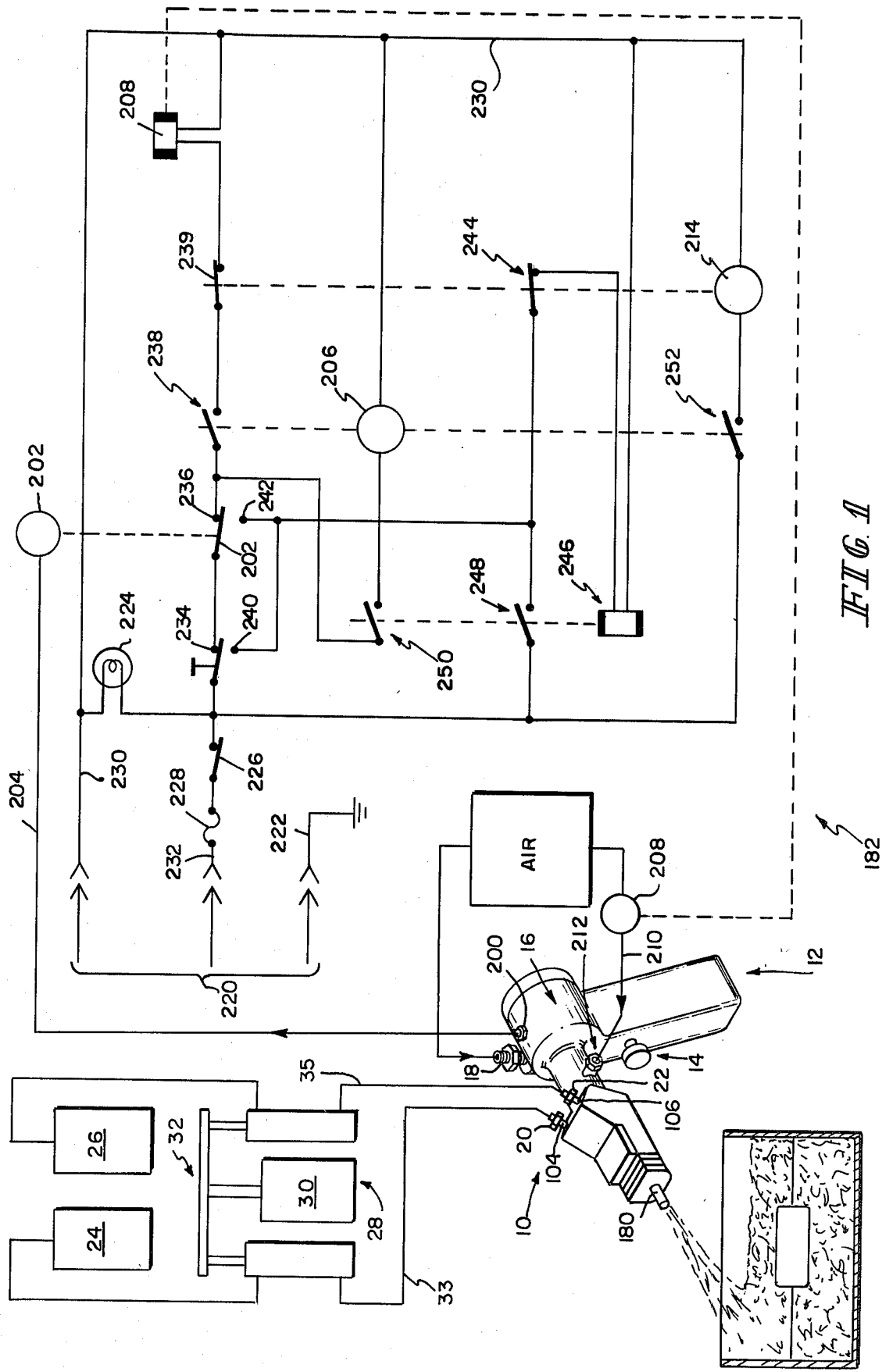
FIG. 1 is a combination diagramatic and electrical schematic view illustrating a device constructed according to the instant invention.

Referring to FIG. 1, the plural component dispensing apparatus 10 is a hand-held device including a pistol grip 12 housing a trigger 14, and a frame portion 16 to which the pistol grip 12 is attached. Frame portion 16 includes an inlet 18 for air, an inlet 20 for a component A (for example, a resin component), and an inlet 22 for component B (for example, a hardener). The frame 16 desirably is cast aluminum or some other material which is not affected by either of the components, and which is capable of supporting moving internal components with relatively little wear. The components A and B are dispensed from tanks 24, 26, respectively, through a pump 28 which, in the illustrated embodiment, includes a hydraulic cylinder 30 driving separate A and B component sections through a yoke 32. Separate hoses 33, 35 deliver the A and B components, respectively, to the apparatus 10.

Referring now to FIGS. 2–3, air from inlet 18 is supplied to an air passageway 38. An air passageway 40 extends upward from a generally cylindrically shaped trigger mechanism housing 44. Passageway 40 extends through the wall of a cylinder 46 near the forward end 48 of cylinder 46. The rearward end 50 of cylinder 46 is closed by a large metal plug 54. An air passageway 56 extends upwardly from housing 44 and intersects cylinder 46 near the rearward end 50 thereof.

A piston 47 is reciprocable in cylinder 46. Piston 47 includes a ring 49 which seals the piston to the wall of cylinder 46 and defines within cylinder 46 a forward chamber 53 and a rearward chamber 55.

Housing 44 houses a plunger-type trigger mechanism 58 which has enlarged annular forward and rearward portions 60, 62. Portions 60, 62 are grooved, and annular seals 64, 66 are mounted in the grooves in portions 60, 62, respectively. Mechanism 58 includes a rearwardly-opening cylindrical chamber 68 housing a coil spring 70. Spring 70 is positioned against the inside rear end 72 of housing 44 to urge mechanism 58 forward. With mechanism 58 in the forward position, a chamber 76 defined between the wall of housing 44 and mechanism 58, and between the forward and rearward portions 60, 62 connects passageway 38 to passageway 40, and thus to chamber 53.

When trigger 14 is depressed, mechanism 58 is moved toward the rear end 72 of housing 44, and chamber 76 connects passageway 38 to passageway 56. Piston 47 is thereby forced toward the forward end 48 of cylinder 46. Air in chamber 53 exhausts through passageway 40, housing 44, and an air passageway 78 formed in grip 12 in the forward lower side of housing 44.

When trigger 14 is released, mechanism 58 is returned by spring 70 to its forward position illustrated in FIG. 2, in which air from manifold 34 passes through air passageway 38, chamber 76 and passageway 40 to chamber 53. Piston 47 is forced to the rearward end 50 of cylinder 46. Air in rearward chamber 55 exhausts through passageway 56 and the upper rearward portion of housing 44 and a passageway 80 provided in the rearward end of housing 44.

A rod 82 extends through a bore 84 in piston 47. Piston 47 is positioned on the end of rod 82 by a pair of split locking rings 86 in annular grooves provided on rod 82. Rod 82 extends forward from piston 47 through a seal 88 and a bore 90 in frame 16. Rod 82 is reciprocable in bore 90. The forward end of rod 82 provides a rack 92.

The forward end of frame 16 includes a valve housing section 94, a valve retaining plate 96, an orifice plate 98 and an end plate 100, all of which are removably attached, such as by cap screws to the forward end of the frame. This particular construction provides for rapid and easy disassembly of portions 94, 96, 98 and 100 from frame 16 for cleaning when dispensing operations are not being conducted.

Frame 16 includes two fittings 104, 106 on top of the frame for connection of hoses 33, 35, respectively (FIG. 1). Passageways 108, 110 extend from fittings 104, 106, respectively, into frame 16. Passageways 108, 110 terminate in orifices 112, 114, respectively (FIGS. 2–3). These orifices are surrounded by annular seals 116. Attachment of valve housing portion 94 to the end of frame 16 compresses seals 116. Housing portion 94 includes a pair of enlarged cylindrical openings 118 which are axially aligned with orifices 112, 114. Each of openings 118 houses a ball valve 122 between a pair of facing, cup-shaped inserts 126. Passageways 128 are provided in all of the inserts 126, the passageways 128 being aligned with orifices 112, 114. Passageways 130 extend diametrically through ball valves 122.

Passageways 130 align with their respective passageways 128 in inserts 126 when valves 122 assume first orientations. Other orientations of valves 122 move passageways 130 out of alignment with passageways 128.

Valves 122, are provided with slots 134 which open upwardly through openings 138 in valve housing portion 94. Axially upwardly from openings 138, cavities 142 are provided in portion 94. Cavities 142 intersect longitudinal bore 90 along their adjacent sides. Cavities 142 house pinion gears 146 with teeth meshing with rack 92. Shafts 150 on pinion gears 146 are provided with O-ring seals 152 to seal the shafts 150 in openings 138. Shafts 150 are also provided with axially extending tongues 154 which fit into slots 134. Rotation of pinion gears 146 which results from reciprocation of connecting rod 82 turns ball valves 122 to open passageways 130 for material flow from apertures 112, 114 through openings 156, 158 in spacer plate 96.

An additional passageway 160 in housing portion 94 is aligned with a passageway 162 in valve retaining plate 96. These openings are aligned with an air passageway 163 in frame 16 to supply air to the forward end of dispenser 10.

Orifice plate 98 includes passageways 164, 166, 168 which extend from openings 156, 158, 162, respectively, in valve retaining plate 96 forward and toward one another, terminating at orifices 170, 172, 174, respectively. Materials discharged from orifices 170, 172 impinge against one another, resulting in turbulent mixing of these materials as they leave orifices 170, 172.

End plate 100 includes a portion defining a mixing chamber 176 in which this mixing among the materials occurs. An annular seal 178 surrounds chamber 176 to seal it against leakage when end plate 100 and orifice plate 98 are bolted together. End plate 100 further includes a nozzle 180 which provides for a flow of mixture from mixing chamber 176 from apparatus 10. Housing portion 94 includes a gear cover 181 (FIG. 2) which bolts to the top of the housing to retain pinion gears 146, 148.

Actuation of trigger 14 provides a path between fittings 104, 106 and orifices 170, 172, for components A and B of the foam packaging material. A control system 182 (FIG. 1), separate from trigger 14, is provided to supply air through passageway 163 to orifice 174. Control system 182 is provided to use air as a purging medium for removing the two-component mixture from mixing chamber 176 after trigger 14 is released.

The control system 182 includes a fitting 200 providing communication between a pressure switch 202 and chamber 55 of cylinder 46. This pressure switch effectively senses when valves 122 are in orientations blocking flows of the first and second components. An air hose 204 couples fitting 200 to the pressure switch 202. Pressure switch 202 produces a signal in response to sensing of this blocking orientation of valves 122. That signal is provided to a time delay relay 206. Time delay relay 206 provides a delay of a predetermined time interval between the end of a dispensing operation and the beginning of a purging cycle. This is frequently desirable, since dispensing of the mixed components will frequently be stopped for brief intervals during which the dispensing device operator will not want the mixed plural components purged from the gun. The time delay relay 206 can be selected to provide a time interval longer than the longest intermittent delay the device 10 operator will experience during ordinary operation. At the same time, the time delay provided by relay 206 will be sufficiently short that the mixed components will not harden in the mixing chamber 176.

The time delay relay 206 produces an output signal which drives a solenoid valve 208. The solenoid valve 208 is coupled to the source of air under pressure, and through an air line 210 to a fitting 212 provided at the end of air passageway 163 in frame 16 (See FIG. 3). When the time delay relay 206 generates an output signal at the end of the predetermined period of time, solenoid valve 208 is opened and purging air is supplied through air line 210, fitting 212 and passageways 163, 160, 162, 168 and orifice 174 to blow the mixed components from the chamber 176.

A signal from time delay relay 206 also initiates a time delay relay 214. Time delay relay 214 is provided to time the purging cycle. Accordingly, the signal from time delay relay 206 starts the time delay relay 214, and at the end of a selected second time interval, time delay relay 214 generates a signal which is used to close the solenoid valve 208 to terminate the purging cycle.

The electrical circuitry for achieving these functions includes a three prong male connector 220 for connecting to a grounded 110 volt alternating current supply. Conductor 222 from the connector 220 is grounded. A pilot lamp 224, on-off switch 226 and fuse 228 are connected in series across the remaining conductors 230, 232.

The solenoid of valve 208, in series with a double-pole, double-throw test switch contact 234, a double-pole, double-throw pressure switch 202 contact 236, a single-pole, single-throw relay 206 controlled switch 238, and a single-pole, single-throw relay 214 controlled switch 239, are connected in parallel across the pilot lamp 224. The remaining contact 240 of the test switch and the remaining contact 242 of the pressure switch 202 are coupled together, and are coupled in series with single-pole, single-throw relay 214 controlled switch 244 and through the solenoid of a holding control relay 246 to conductor 230. A holding control relay 246-controlled, single-pole, single-throw switch 248 is connected in series between contacts 240, 242 and conductor 232, through fuse 228 and on-off switch 226. An additional holding control relay 246-controlled single-pole, single-throw switch 250 and time delay relay 206 are coupled in series between contact 236 and conductor 230. A single-pole, single-throw switch 252, controlled by time delay relay 206, is coupled in series with the time delay relay 214 between conductor 230 and conductor 232, through on-off switch 226 and fuse 228.

In operation, the air signal relayed through line 204 when the dispenser 10 is dispensing the mixed components holds the pressure switch against contact 242. During this "dispense" interval, the complete circuit through contacts 234, 242 switch 244 and relay 246 between conductors 230, 232, closes the holding control relay 246-controlled switches 248, 250. At the end of the "dispense" cycle, the pressure drops in air line 204, permitting the pressure switch to make contact with contact 236. This completes the circuit through time delay relay 206, switch 250, contact 236 and contact 234 between conductors 230, 232. This begins the "purge start" delay. At the end of the "purge start" delay, switches 238, 252 are closed. These closures complete the circuits through the solenoid of valve 208, switch 239, switch 238, and contacts 236, 234 between conductors 230, 232 to open valve 208 and begin the purging cycle. This also completes the circuit through time delay relay 214 and switch 252 between conductors 230, 232 to initiate the purge cycle timing function. At the end of the purge cycle, time delay relay 214 opens switch 239 and switch 244. This opening interrupts the flow of current through the solenoid of valve 208, closing valve 208 and terminating the purging cycle. This also interrupts the flow of current through the holding control relay 246 solenoid which in turn opens switches 248, 250. This, in turn, interrupts current flow through relay 206, opening switches 238, 252. The entire system 182 is thereby returned to its original state.

It should be noted that the same cycling through the purge delay cycle and purging cycle can be achieved by depressing the test switch to connect contact 234 to conductor 232.

What is claimed is:

1. An apparatus for dispensing a mixture of materials, which, upon being mixed, undergo a reaction which produces a non-flowable material, the apparatus comprising means for providing flows of the materials for mixing, a housing to which the material flow-providing means is coupled, the housing including first and second valve means in communication with the flow-providing means, and a chamber from which the mixed materials are expelled from the apparatus, the first and second valve means being housed for movement between first orientations in which the first and second valve means provide a flow of the mixed materials from the chamber and second orientations halting flow of the mixed materials from the chamber, means for providing a flow of a purging medium, additional valve means for controlling flow of the purging medium, means providing communication between the additional valve means and the chamber to provide a flow of the purging medium to the chamber, means for sensing when the first and second valve means are placed in the second orientations, and timing means coupled to the sensing means to time a first interval starting when the first and second valve means are placed in said second orientations and to open the additional valve means when the first interval reaches a predetermined non-zero duration to start the purging cycle.

2. The apparatus of claim 1 and further comprising means for sensing when the additional valve means is opened and for timing a second interval starting when the additional valve means is opened and to close the additional valve means when the second interval reaches a predetermined non-zero duration.

3. An apparatus for dispensing mixed materials subject to hardening, the apparatus comprising means for providing flows of the materials, a housing to which the material flow-providing means is attached, the housing including first and second valve means in communication with the flow-providing means, and a chamber into which the materials flow for mixing and from which the mixed materials are expelled from the apparatus, the first and second valve means being housed for movement between first orientations in which the first and second valve means provide a flow of the mixed materials from the chamber and second orientations halting flow of the mixed materials from the chamber, means for providing a flow of a purging medium, additional valve means for controlling flow of the purging medium, means providing communication between the additional valve means and the chamber to provide a flow of the purging medium to the chamber, means for sensing when the first and second valve means are placed in the second orientations, timing means coupled to the sensing means to time a first interval starting when the first and second valve means are placed in said second orientations and to open the additional valve means when the first interval reaches a predetermined non-zero duration, and means for sensing when the additional valve means is opened and for timing a second interval starting when the additional valve means is opened and to close the additional valve means when the second interval reaches a predetermined duration.

4. A plural component dispensing apparatus comprising means for providing flows of first and second components, a housing to which the first and second flow-providing means are attached, the housing including a first valve in communication with the first flow-providing means and a second valve in communication with the second flow-providing means, each of the first and second valves being housed for movement between a first orientation in which the valves provide passage of the components therethrough and a second orientation blocking passage of the components, means communicating with the first and second valves for providing mixing of the components and directed expulsion of the mixed components from the housing, means for providing a flow of a purging medium, a third valve for controlling flow of the purging medium, means providing communication between the third valve and the mixing and expelling means to provide a flow of the purging medium to the mixing and expelling means, means for sensing when the first and second valves are placed in the second orientations, first timing means coupled to the sensing means to time a first interval starting when the first and second valves are placed in said second orientations and to open the third valve when the first interval reaches a predetermined non-zero duration, and means for sensing when the third valve is opened and for timing a second interval starting when the third valve is opened and to close the third valve when the second interval reaches a predetermined non-zero duration.

5. A dispensing apparatus for plural component materials comprising a housing adapted to be connected with means to supply flows of first and second materials, first and second valves carried by said housing to control flows of said first and second materials, respectively, means for operating said first and second valves, means provided by said housing and adapted to mix the first and second materials when flowing and to direct the mixed materials from the housing, the operating means including a trigger for moving the valves between first positions where said valves are open to permit the first and second materials to flow through said dispenser for mixing and directed expulsion, and second positions where said valves are closed to halt the flows of the first and second materials, means for sensing the positions of said first and second valves and for generating a first signal when said material flows through said valves are halted, a first timer responsive to said first signal to time a first interval during which said first and second valves are closed and to generate a second signal when said first interval reaches a predetermined non-zero duration, a third valve controlling flow of a purging medium to said mixing and directing means, means for coupling the third valve to receive the second signal, a second timer for receiving the second signal to time a second non-zero interval during which the purging medium flows to the mixing and directing means and for closing the third valve to halt the flow of the purging medium at the end of the second time interval.

6. A plural component dispensing apparatus comprising means for providing flows of first and second components, first and second valves for controlling flow of the first and second components, respectively, trigger means for controlling the first and second valves to move them between first orientations in which they permit flows of the first and second components and second orientations in which they block the two component flows, means for mixing the first and second components, means for sensing when the first and second valves are moved to the second orientations and for generating a first signal in response to sensing such movement, first means for timing the duration between initiation of such first signal and movement of said first and second valves to said first orientation and for generating a second signal when said duration reaches a first non-zero time limit, means for coupling said first signal from said sensing means to said first timing means, third valve means controlling the flow of a purging medium to said mixing means for said first and second components, means for coupling said third valve means to said first timing means, said third valve means having a first orientation blocking flow of said purging medium to said mixing means and a second orientation permitting such flow, said third valve means moving to said second orientation in response to said second signal, second means for timing the duration of a time interval after said second signal and for generating a third signal when said interval reaches a second non-zero time limit, means for coupling said third valve means to said second timing means, said third valve means being responsive to said third signal to move to said first orientation.

7. An apparatus for dispensing a material, the apparatus comprising means for providing a flow of the material, a housing to which the material flow-providing means is coupled, the housing including a chamber from which the material is expelled from the apparatus, first valve means for movement between a first orientation in which the first valve means provides a flow of the material from the chamber and a second orientation halting flow of the material from the chamber, a supply of a purging gas or gas mixture, additional valve means for controlling flow of the purging gas or gas mixture to the chamber, means providing communication between the additional valve means and the chamber, means for moving the first valve means between the first and second orientations, means for coupling the first valve moving means to the supply of purging gas or gas mixture, the coupling means including a trigger having a first position corresponding to the first orientation of the first valve means and a second position corresponding to the second orientation of the first valve means, means for responding to pressure changes in the first valve moving means to sense movement of the first valve means from the first orientation to the second orientation, means for timing a first non-zero interval, means for coupling the timing means to the movement-sensing means and means for coupling the timing means to the additional valve means, timing of the first interval causing the purging gas or gas mixture to flow in the chamber.

8. The apparatus of claim 7 wherein the timing means further times a second non-zero interval starting when the additional valve means is opened, the timing means closing the additional valve means to halt the flow of purging gas or gas mixture from the chamber at the end of the second interval.

* * * * *